April 16, 1935.  L. A. KOCH, JR  1,998,087
DYNAMO ELECTRIC MACHINE
Filed June 20, 1933
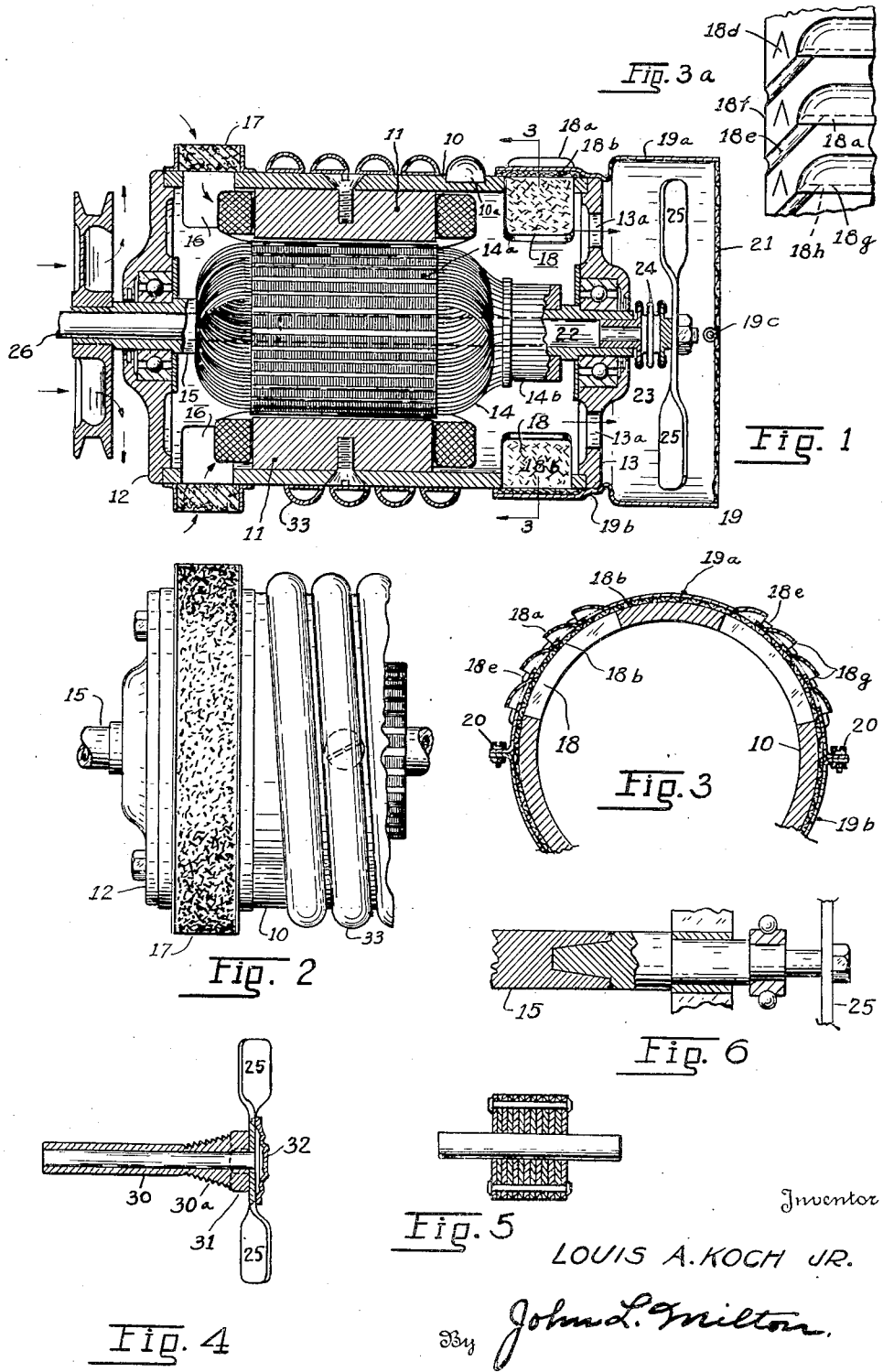
Inventor
LOUIS A. KOCH JR.
By John L. Milton.
Attorney Patented Apr. 16, 1935

1,998,087

UNITED STATES PATENT OFFICE 1,998,087

DYNAMO ELECTRIC MACHINE

Louis A. Koch, Jr., Louisville, Ky.

Application June 20, 1933, Serial No. 676,712

7 Claims. (Cl. 171—252)

This invention relates to means for dissipating heat arising from the flow of current in the electrical conductors of dynamo electric machines.

The main object of this invention is to equip dynamo electric machines with simple and inexpensive apparatus which will enable it to reliably and automatically dissipate impairing heat arising from normal and/or excessive loads and thereby incorporate into the mechanical and electrical elements mechanical dependability heretofore unattained, except by means of involved and complicated equipment. The result of said object will be manifested in a materially increased life of usefulness.

It is a recognized phenomenon, under the influence of heat resulting from operation, for the rotor shaft of a dynamo electric machine, especially of the direct current type, to expand linearly in actual measurements more than the stator, even though each were composed of the same material and possessed the same coefficient of expansion. This is directly traceable to unequal concentration of heat and/or unequal ventilation, or the absence of adequate heat dissipating media. The successful use of ball bearings in this class of machine has therefore necessitated a very special treatment, at variance from methods wherein this condition of unequal expansion was not present. Hence, a further object of this invention is to provide means where ball bearings with ordinary mountings can be successfully employed, which are more dependable by reason of the absence of the special equipment to permit the bearings to adjust their locations to ever varying dissimilar physical conditions of the bearing mountings and further, special equipment for mountings involves extra and unnecessary expense.

The conditions, provoking department from standard dynamos as supplied on automotive vehicles, were set forth in applicant's U. S. Application, Serial No. 641,481, directed to conditioning old generators for heavy duty service without impairment. Inasmuch as the principles embodied in this application are a product of a further study of the conditions referred to above, the following is repeated herewith:

It is well known to those of the automotive industry that the vendors of equipment, especially those that pertain to the electrical apparatus, have been forced to supply products at ever decreasing prices, which has resulted in skimping of materials and workmanship and in many and increasing instances they have been decreased to such an extent that on continuous operation with the added loads of horns, windshield wipers, radio, heaters, et cetera, excessive heating ensues, and to an extent that the wires, commutator, et cetera, are impaired, if not destroyed. Free wheeling and automatic clutches are also contributors to the growing difficulties as the engines are permitted to "idle" for an increased percentage of travel and thereby reduce the watt hour output of the generator, which causes them to be additionally taxed when they are at generating speeds. Present day operation of trucks with trailers, delivery wagons making frequent stops and "cruising" speeds of police cars all reduce the generator's ability, under these operating conditions, to provide the desired current.

While air cooling of dynamo-electric machinery for certain classes of service is a well known expedient, it has heretofore not been effectively adopted for the automotive industry. There are many obvious reasons for this. In the first place the generators have been of completely enclosed design, this is in part due to inherited custom, dating back to the time when price was not such a factor and auxiliary equipment had not asserted itself with abnormal demands on the generator. Again these generators have been so compactly designed that ordinary expedients to effect air cooling were prohibitive either from the standpoint of effectiveness or cost of production. Another barrier to air cooling resides in the necessity for preventing foreign material from becoming entangled with the rapidly revolving armature. Again for dependable operation of automotive generators, it is necessary to devise efficient and inexpensive means to exclude water. Still another advantage resulting from th continued introduction of cleaned air into the generator resides in removing carbon and copper dust resulting from wear of the brushes on the comutator.

The purveyors of generators to the automotive industry are few in numbers and occupy such powerful commercial positions that the public is forced to buy automotive vehicles with generators incompetent to carry the volt ampere load imposed upon them by reason of added equipment or pay an exhorbitant price for a reliable one that can safely carry said load, therefore, an outstanding object of this invention is to provide the individual owner with dependable inexpensive means for converting standard generators into effectively air cooled ones without rebuilding or even rewinding same and further, in many cases where the maximum watt hour capacity is not required, effective air cooling can be provided without even disassembling the heads or bearings from the field yoke.

Other objects and advantages of the structure and combination are hereinafter set forth in detail and will be apparent to persons skilled in the allied arts to which this invention relates and to their advantages insofar as they are patentably novel, I will claim, the same as hereinafter set forth:

Drawing

Fig. 1 is an elevational view of a direct current dynamo electric machine shown principally in cross section.

Fig. 2 is a top view of a portion of Fig. 1 disposed at an angle of 90° to Fig. 1.

Fig. 3 is a section of the fan cover shown in Fig. 1 and disposed on the machine along line 3, 3. Fig. 3a is a section of Fig. 3.

Fig. 4 is an elevational view of a modified construction of the core which carries a fan as an integral part.

Fig. 5 is an elevation of a rotor shown in cross section together with its shaft.

Fig. 6 shows a modified structure of an armature shaft in elevation, partially in cross section.

Structure and operation 10 indicates a generator yoke equipped with the usual pole pieces 11, housing ends 12, 13, each equipped with bearings for rotatively supporting armature 14 through the medium of shaft 15. In the drive end of the yoke 10, openings 16 afford communication from the interior of the generator to the atmosphere and are protected against the ingress of foreign matter by filter pad 17.

Commutator windows or openings 18 at the other end of generator are protected by fan housing 19, which displaces the conventional commutator "strap". It is fashioned with louvres 18a, under which are also found filter medium 18b. The filter medium is preferably composed of a screen or metal textile and is secured to the housing by means of tongues 18d, cut from the housing. Attention is directed to the series of ribs 18e, which are struck in the housing after the louvres are cut and formed. These are provided to admit additional air and to shorten the margins 18f and thereby cause lips 18g to extend over or overhang arcuate section 18h, to provide an effective watershed. The conventional window strap can be equipped with this louvre and filter structure to provide a practicable ventilator.

The housing 19 is made in two sections 19a, 19b, as shown in Fig. 3 and is hinged at 19c. It will be observed that by removing screws 20 that the entire cover can be opened and removed. The circular face opening of this fan housing is protected by a screen or guard 21.

Armature shaft 13 is shown as bored throughout its length to form a duct or cavity 22 which is to be utilized for disposing a media, referred to herein as a "core", to be employed for conducting heat from the laminations 14a or the commutator 14b as well as the windings. In the commutator end of the shaft is shown a plug 23, of high thermal conductivity, which not only closes duct 22 but supports a metallic bellows 24 which in turn supports fan 25, also of high thermal conductivity. It functions to radiate heat directly into the atmosphere as well as to change air within the machine. The other end of bore 22 is closed with a rod 26 of high thermal conductivity to transmit objectionable deteriorating temperatures from the armature to the pulley end where it is readily transmitted to the pulley or directly to the atmosphere.

In duct 22 a liquid or a salt, such as caustic potash, fusible at low temperatures is confined by the end closures as described for the purpose of efficiently conducting heat from the armature to the plug ends, also, to the metallic bellows 24 and in direct communication with the fan 25, the bellows being incorporated for the prime purpose of permitting expansion and contraction without disruption. It also renders additional service for radiation to the atmosphere. By this method duct 22 and the bellows are maintained full of the liquid, not only to procure a maximum convection but to prevent the salt, upon solidifying from throwing the rotating parts out of balance. It will be perceived that upon cessation of rotation that solidifying of the liquid salt into a solid would, upon rotation, produce a mechanical unbalance if it were allowed to solidify on one side of the rotating members, hence the bellows defeats such an undesirable result.

The modification in Fig. 4 shows a quill 30 extending well into liquid filled duct 22 to form the core, and is equipped with a nut 31 for a wrench for forcing the taper screw threads 30a into the end of shaft 13, which of course must be correspondingly threaded to receive same.

The metallic diaphragm 32 is disposed as shown to function correspondingly to the metal bellows 24 of Fig. 1.

Fig. 5 represents a section of an A. C. rotor with a solid shaft of relatively high thermal capacity to transmit surplus heat directly throughout its length from the laminations to atmosphere and thereby prevent undue elongation of the shaft thereby causing the rotor to run at relatively low temperature.

Fig. 6 is a shaft structure which can be substituted for that shown in Fig. 1. The driving end for the shaft is steel and the commutation end of bronze, copper or other material having a relatively high capacity for conducting heat from the interior to the exterior of the machine on which it is mounted.

In Fig. 1, D-shaped copper tube helix 33 is attached to the yoke 10 so as to present a broad surface of contact. These tubes are preferably filled with a liquid, or salt, having a low melting point to assist in conducting heat from the yoke. While Fig. 1 shows this copper tube terminating in the yoke it is of course obvious that it may be connected with means for supplying a circulating liquid.

By a study of the drawing it will be observed that in addition to the means disclosed and described supra, for conducting heat from the rotor to the atmosphere that fan blades 25 which are supported and driven by the plug 23 of high thermal capacity, will cause a circulation of air from the interior of the machine as indicated by the arrows.

As the air is drawn from the interior, fresh air entering openings 16 or louvres 18a will be cleaned by reason of the filter media as shown. Experience has developed the fact that operators of air cooled generators installed on automotive vehicles are sometimes lax in their care of the filter medium, therefore an additional filter 18b has been incorporated into this machine and has been found to be entirely adequate, even though the major filter 17 has been completely clogged with dirt. This is made practicable by the means provided for freeing the rotor of surplus heat.

Scope

Extra figures and several pages of text would be necessary to show and describe the many modifications that assert themselves that are within the scope of the spirit of this invention, therefore, to avoid an unnecessary burden, I wish to be limited only by the appended claims.

I claim:

1. A dynamo electric machine comprising a housing, ends therefor and a rotor mounted on a shaft journaled in said ends, said shaft being composed of ferrous and non-ferrous metals, the latter extending beyond the end of said rotor with a radiating element disposed thereon.

2. A dynamo electric machine comprising a housing, ends therefor and an armature and shaft journaled in said ends, said armature shaft being equipped with a duct containing liquid having a higher thermal coefficient than said shaft, said duct being provided with a diaphragmatic closure.

3. A dynamo electric machine comprising a housing, ends therefor and an armature and shaft journaled in said ends, said armature shaft being equipped with a liquid and metallic core having a higher thermal coefficient than said shaft, said core extending beyond the end of said shaft with a heat dissipating medium disposed thereon, said duct being provided with a diaphragmatic closure.

4. A dynamo electric machine comprising a housing, ends for said machine and an armature and shaft journaled in said ends, said armature shaft being composed of ferrous and non-ferrous metals, the latter extending beyond the ferrous portion of said shaft and organized to carry a fan so correlated to said generator as to force heated air from the interior of same, in exchange for interior air.

5. A dynamo electric machine comprising a housing equipped with means for supplying filtered air to the interior of same, ends for said machine and an armature and shaft journaled in said ends, in combination with said armature shaft which is composed of ferrous and non-ferrous metals, the latter extending to the interior of said machine.

6. A dynamo electric machine comprising a housing equipped with an air filtering medium, ends for said machine and an armature and shaft journaled in said ends, in combination with said armature shaft which is composed of ferrous and non-ferrous metals, the latter extending beyond the end of said shaft and equipped with a fan so correlated to said generator as to draw fresh air through said filter medium and to force heated air from the interior of same.

7. A dynamo electric machine having a housing equipped with an air filter disposed between the interior of same and the atmosphere, ends for said machine and a rotor carried on a shaft mounted in said ends, said shaft being equipped with a removable quill in which is disposed a heat dissipating medium, said quill extending beyond the end of said shaft and being equipped with a fan to force air through said filter.

LOUIS A. KOCH, Jr.